United States Patent [19]

Vernocchi

[11] 3,992,041
[45] Nov. 16, 1976

[54] SAFETY STEERING WHEEL FOR MOTOR VEHICLES
[75] Inventor: Sergio Vernocchi, Arese (Milan), Italy
[73] Assignee: Industria Napoletana Costruzione Autoveicoli Alfa Romeo Alfasud S.p.A., Naples, Italy
[22] Filed: Aug. 27, 1975
[21] Appl. No.: 608,252

[30] Foreign Application Priority Data
Sept. 4, 1974 Italy .................................. 26929/74

[52] U.S. Cl. ................................ 280/750; 74/552
[51] Int. Cl.² ......................................... B60R 21/02
[58] Field of Search ............... 280/150 B, 750, 751, 280/87 R; 74/552

[56] References Cited
UNITED STATES PATENTS

| | | | |
|---|---|---|---|
| 3,016,764 | 1/1962 | Fredericks et al. ................... | 74/552 |
| 3,285,091 | 11/1966 | Fiala ............................ | 280/150 B X |
| 3,546,964 | 12/1970 | Barenyi et al ........................ | 74/552 |
| 3,563,112 | 2/1971 | Wilfert .................................. | 74/552 |
| 3,675,505 | 7/1972 | Henning .............................. | 74/552 |
| 3,948,118 | 4/1976 | Garbin ................................. | 74/552 |

Primary Examiner—M. H. Wood, Jr.
Assistant Examiner—Michael J. Forman
Attorney, Agent, or Firm—Holman & Stern

[57] ABSTRACT

A safety steering wheel for motor vehicles comprising a central structure which is fixed to the steering column, a steering wheel rim, a plurality of spokes which connect the central structure to the steering wheel rim and a rigid cover disposed between the rim and the central structure and fixed to the periphery of the latter; the central structure being arranged to yield by flexure and the spokes being arranged to yield during compression of the steering wheel, and a second structure yieldable on compression being fixed to the periphery of the rigid cover.

9 Claims, 6 Drawing Figures

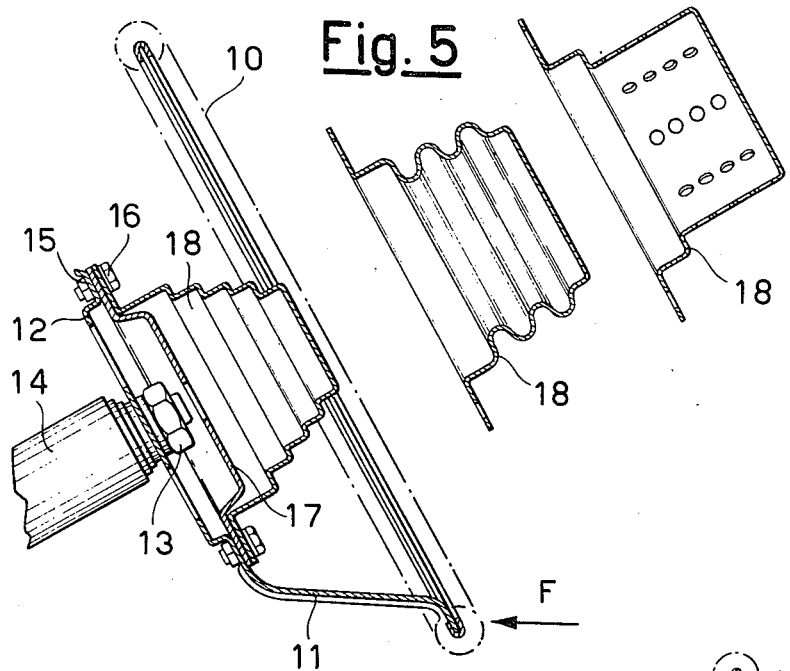
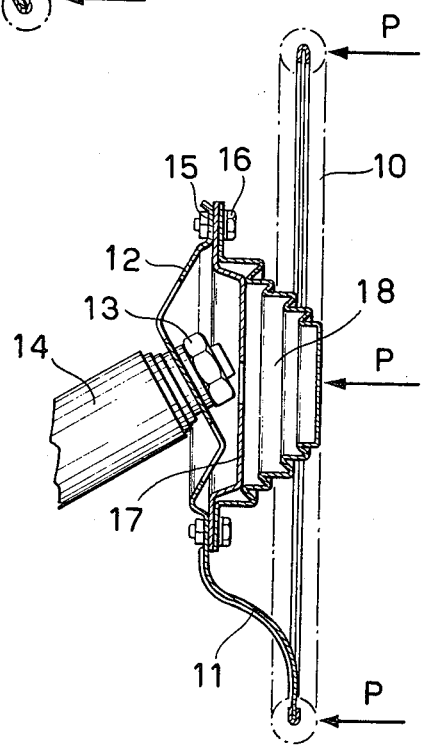

SAFETY STEERING WHEEL FOR MOTOR VEHICLES

FIELD OF THE INVENTION

The invention relates to safety wheels for motor vehicles which comprise a yieldable structure able to reduce physical injury to the driver in cases of accident resulting in impact between the steering wheel and the driver's body.

BACKGROUND OF THE INVENTION

The yieldable structure is situated between the rigid rim of the steering wheel and the steering column, and enables the steering wheel, on impact, to rotate with respect to the steering column so that it becomes disposed parallel to the surface of impact of the driver.

In this manner, the force of impact is discharged over a relatively large surface, so minimizing the specific pressure on the driver's body.

However, these devices do not completely eliminate the potential danger represented by the steering column. In fact, very violent impacts could cause piercing of the yieldable structure, so that the steering column and driver's body are brought into violent contact.

SUMMARY OF THE INVENTION

The main object of the present invention is to provide a safety steering wheel of yieldable structure in which the danger of violent impact between the steering column and driver's body is minimized.

A further object of the present invention is to provide a safety steering wheel of yieldable structure in which the force of impact between the steering wheel and driver's body is discharged over a very large area.

These objects are attained, according to the invention, by a safety steering wheel comprising the combination of a central structure arranged to yield by flexure and fixable to the steering column, a plurality of spokes arranged to yield during compression of the steering wheel and connecting the central structure to a steering wheel rim, and a rigid cover disposed between the rim and the yieldable central structure and fixed to the periphery of this latter.

In a preferred imbodiment of the invention, there is provided a second structure yieldable on compression, fixed to the periphery of the rigid cover.

In this manner, on impact between the driver's body and the lower part of the steering wheel rim, the central structure firstly bends and enables the steering wheel rim to rotate until it becomes disposed parallel to the driver's body, with the rigid cover abutting against the end of the steering column. The steering wheel spokes and the said second yieldable structure, which is generally of chalice shape, then yield in succession under the pressure of the driver's body.

In this manner, the steering column is prevented from piercing the driver's chest, and it will be noted that the central yieldable structure considerably increases the surface of impact between the steering wheel and body.

Other objects in the nature of the invention will become apparent from the consideration of the following description when taken with the drawing forming a part thereof, in which:

BRIEF DESCRIPTION OF THE DRAWINGS

FIG. 1 is a section showing a safety steering wheel incorporating the invention in the normal working position;

FIG. 2 shows the attitude of the steering wheel of FIG. 1 in the case of impact;

FIGS. 5 and 6 are details of modifications.

DESCRIPTION OF PREFERRED EMBODIMENTS

Figure 3:
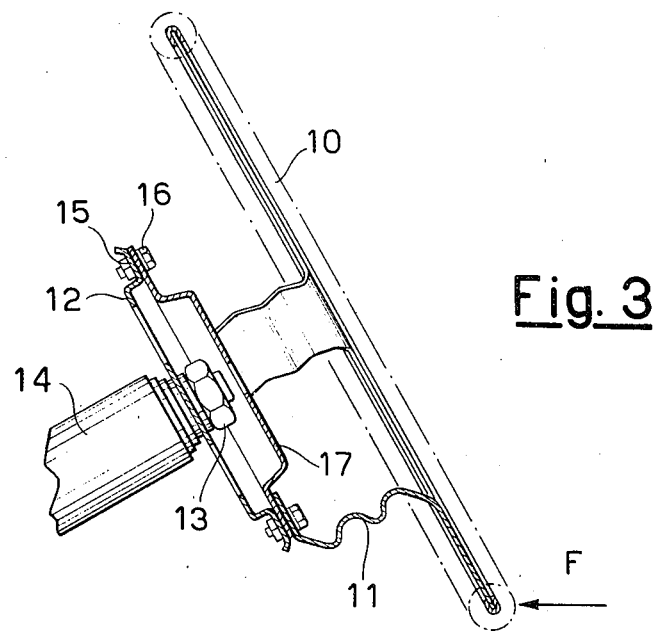
FIGS. 3 and 4 are views analogous to those of FIGS. 1 and 2, respectively, showing another embodiment of steering wheel incorporating the invention.

The steering wheel shown in FIG. 1 consists structurally of a rigid rim or outer ring 10 to which are fixed the ends of a plurality of spokes 11, yieldable during compression of the steering wheel, their opposite ends being integral with a central structure 12 yieldable by flexure. The central structure 12 is designed for fixing at 13 to the steering column 14. It comprises a rigid perimeter flange 15 on to which, at 16, is fixed a rigid cover 17 and preferably a cap-like structure 18 yieldable on compression and shaped generally as a chalice. As is evident from FIG. 1 of the drawings, the end 13 of the steering column 14 is boxed between the components 12, 17 and 18.

The operation of the safety steering wheel heretofore described in case of accident is as follows:

The driver's body, projected forwards, first collides in the direction of the arrow F against the lower part of the rim 10. Consequently, the central structure 12, subjected to bending stress, yields and enables the steering wheel to bend into the position of FIG. 2, substantially parallel to the driver's body. During this stage of yielding and flexure, the rigid cover 17 abuts against the end 13 of the steering column and reacts against it. The steering wheel, in the vertical position of FIG. 2, is then subjected to compressive stress in the direction of the arrows P. Consequently, the spokes 11 and the central chalice structure 18, directly compressed by the driver's body, yield. It is evident that the rigid cover 17 constitutes a valid barrier between the steering column 14 and driver's body. The presence of the structure 18, which works by pure compression, leads to a reduction in the force of impact which, discharging over a much greater area, produces considerably lower specific pressures on the driver's body.

In the steering wheel according to the invention shown in FIGS. 1 and 2, the structure 18 is stepped, but could evidently assume other advantageous shapes. It may be corrugated as shown in FIG. 5 or perforated as shown in FIG. 6, the steps, corrugations and perforations all inducing collapse.

Figure 4:
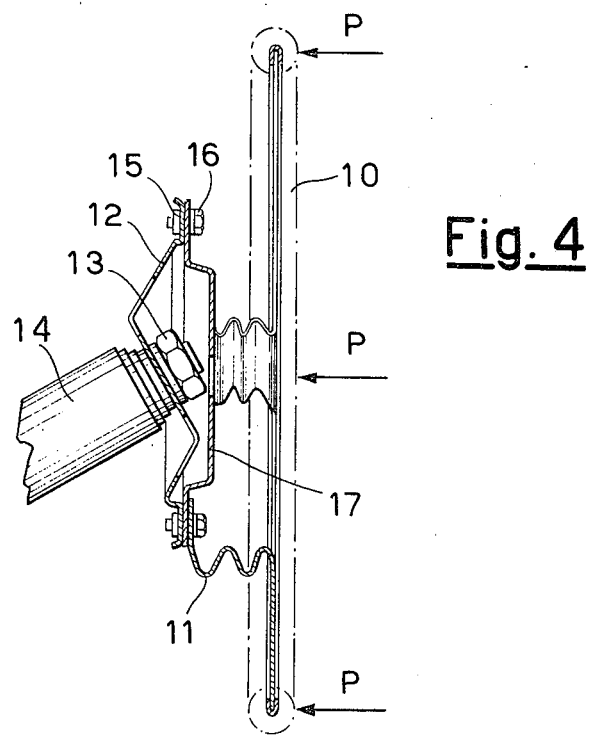

FIGS. 3 and 4 show a further steering wheel incorporating the invention. The structure of this steering wheel is analogous to that of FIGS. 1 and 2, with the exception that the spokes 11 are corrugated.

Furthermore, the spokes 11 are not formed integrally with the central structure 12, as in the example of FIG. 1, but are constructed separately and then fixed to the structure 12, for example, by welding.

Evidently, the structure of the steering wheel, although being yieldable, has sufficient consistency to correctly transmit the normal working torques.

What we claim is:

1. A safety steering wheel for motor vehicles, comprising a rigid steering wheel rim, a flexure-yieldable structure attached to said steering wheel rim and including means for fixing the rim to an inclined steering column of a vehicle so that the steering wheel rim will rotate with respect to the steering column axis of rotation, from an inclined plane to a plane lying substantially perpendicular to an impact direction due to impact of a driver's body with the steering wheel rim, said flexure-yieldable structure having a substantially flat form and comprising a rigid perimeter flange attached to the steering wheel rim for rotating therewith in case of impact, a rigid central hub including means to be fixed to the steering column, and flexure-yieldable connecting rods attached to said perimeter flange and said central hub for allowing the former to rotate with respect to the latter in case of impact, a rigid cover fixed onto said perimeter flange of the flexure-yieldable structure to rotate therewith for substantially avoiding any axial movement thereof toward the steering column in case of impact, and a compression-yieldable structure fixed on said rigid cover to rotate therewith in case of impact and substantially disposed between the rigid cover and the plane of the steering wheel rim to act, after rotation of the steering wheel rim and the rigid cover, as a compression-yieldable resistant element disposed forwardly of the steering column in the impact direction to yieldably resist the movement of a driver's body towards the steering column.

2. A steering wheel as claimed in claim 1 wherein said compression-yieldable structure is separated from the steering wheel rim and is located substantially centrally with respect thereto, yieldable spokes being provided for connecting the steering wheel rim to the perimeter flange of the flexure-yieldable structure.

3. A steering wheel as claimed in claim 1, wherein said compression-yieldable structure comprises corrugated spokes, which connect the steering wheel rim to the rigid cover.

4. A steering wheel as claimed in claims 1, wherein said structure yieldable on compression is generally of chalice shape.

5. Steering wheel as claimed in claim 1, wherein the spokes and central structure yieldable by flexure is one piece.

6. A steering wheel as claimed in claims 1, wherein the structure yieldable on compression comprises means for inducing its collapse.

7. A steering wheel as claimed in claims 6, wherein said means for inducing collapse consists of stepped portions.

8. A steering wheel as claimed in claims 6, wherein said means for inducing collapse consists of corrugations.

9. A steering wheel as claimed in claims 6, wherein said means for inducing collapse consists of perforations.

* * * * *